(12) United States Patent
Buchholz

(10) Patent No.: US 9,466,182 B2
(45) Date of Patent: Oct. 11, 2016

(54) COORDINATING ACCESS TO WAGERING GAME MACHINE WINDOWS

(71) Applicant: WMS Gaming, Inc., Waukegan, IL (US)

(72) Inventor: Dale R. Buchholz, Palatine, IL (US)

(73) Assignee: BALLY GAMING, INC., Las Vegas, NV (US)

( * ) Notice: Subject to any disclaimer, the term of this patent is extended or adjusted under 35 U.S.C. 154(b) by 672 days.

(21) Appl. No.: 13/778,948

(22) Filed: Feb. 27, 2013

(65) Prior Publication Data

US 2013/0225281 A1 Aug. 29, 2013

Related U.S. Application Data

(60) Provisional application No. 61/603,933, filed on Feb. 27, 2012.

(51) Int. Cl.
*G07F 17/34* (2006.01)
*G07F 17/32* (2006.01)

(52) U.S. Cl.
CPC ........... *G07F 17/34* (2013.01); *G07F 17/3211* (2013.01); *G07F 17/3225* (2013.01); *G07F 17/3227* (2013.01)

(58) Field of Classification Search
None
See application file for complete search history.

(56) References Cited

U.S. PATENT DOCUMENTS

| | | | |
|---|---|---|---|
| 6,175,876 B1 | 1/2001 | Branson et al. | |
| 2003/0176213 A1* | 9/2003 | LeMay | G07F 17/32 463/20 |
| 2005/0085300 A1* | 4/2005 | Johnson | G07F 17/32 463/42 |
| 2005/0153776 A1* | 7/2005 | LeMay | G07F 17/32 463/30 |
| 2006/0068907 A1* | 3/2006 | DiMichele | G07F 17/32 463/30 |
| 2007/0243925 A1* | 10/2007 | LeMay | G07F 17/32 463/20 |
| 2008/0009344 A1 | 1/2008 | Graham et al. | |
| 2008/0125219 A1 | 5/2008 | Williams et al. | |
| 2008/0293494 A1* | 11/2008 | Adiraju | G07F 17/32 463/42 |
| 2008/0318669 A1 | 12/2008 | Buchholz | |
| 2009/0029767 A1 | 1/2009 | Buchholz et al. | |
| 2009/0164607 A1* | 6/2009 | Clark | G06F 17/30867 709/219 |
| 2009/0221366 A1 | 9/2009 | Ward et al. | |
| 2009/0233705 A1 | 9/2009 | LeMay et al. | |
| 2010/0029375 A1 | 2/2010 | Buchholz | |
| 2010/0048294 A1 | 2/2010 | Buchholz et al. | |
| 2010/0190553 A1 | 7/2010 | Buchholz et al. | |

(Continued)

FOREIGN PATENT DOCUMENTS

| | | |
|---|---|---|
| WO | WO-2008094242 | 8/2008 |
| WO | WO-2009102915 | 8/2009 |
| WO | WO-2010077446 | 7/2010 |

OTHER PUBLICATIONS

Gaming Standards Association, , "Game To System", *G2S Message Protocol V2.1 Draft 8* (Beginning-Chapter 15) Jan. 3, 2012 , 1450 pages.

(Continued)

*Primary Examiner* — Tramar Harper
(74) *Attorney, Agent, or Firm* — DeLizio Law, PLLC

(57) ABSTRACT

Systems and methods coordinate requests to display content on one or more windows of a display screen of a wagering game machine. A display control process determines whether or not to honor a request to display content in accordance with an owner status of a window, a lock status of the window, a lock status of the wagering game machine, or a combination thereof.

20 Claims, 11 Drawing Sheets

(56) References Cited

U.S. PATENT DOCUMENTS

2010/0218260 A1    8/2010   Schwartz et al.
2011/0028203 A1    2/2011   Agarwal et al.
2011/0250955 A1*  10/2011   Adiraju ................ G07F 17/323
                                                            463/29
2011/0300925 A1   12/2011   Adiraju et al.

OTHER PUBLICATIONS

Gaming Standards Association, , "Game To System", *G2S Message Protocol V2.1 Draft 8* (Chapter 16-End) Jan. 3, 2012 , 1571 pages.

\* cited by examiner

COORDINATING ACCESS TO WAGERING GAME MACHINE WINDOWS

RELATED APPLICATIONS

This application claims the priority benefit of U.S. Provisional Application Ser. No. 61/603,933 filed Feb. 27, 2012.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2012, WMS Gaming, Inc.

FIELD

Embodiments of the inventive subject matter relate generally to wagering game systems, and more particularly to coordinating access to windows on wagering game machines in wagering game systems.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

BRIEF DESCRIPTION OF THE FIGURES

Embodiments of the invention are illustrated in the Figures of the accompanying drawings in which.

DESCRIPTION OF THE EMBODIMENTS

This description of the embodiments is divided into five sections. The first section provides an introduction to embodiments of the invention, while the second section describes example wagering game machine architectures. The third section describes example operations performed by some embodiments and the fourth section describes example wagering game machines in more detail. The fifth section presents some general comments.

Introduction

This section provides an introduction to some embodiments of the invention. In general, the embodiments of the invention coordinate management of windows on a wagering game machine that can be accessed from multiple hosts. Various types of windows can be coordinated, and different coordination mechanisms may be used for different types of windows on a wagering game machine.

Example Wagering Game Machines

Figure 1:
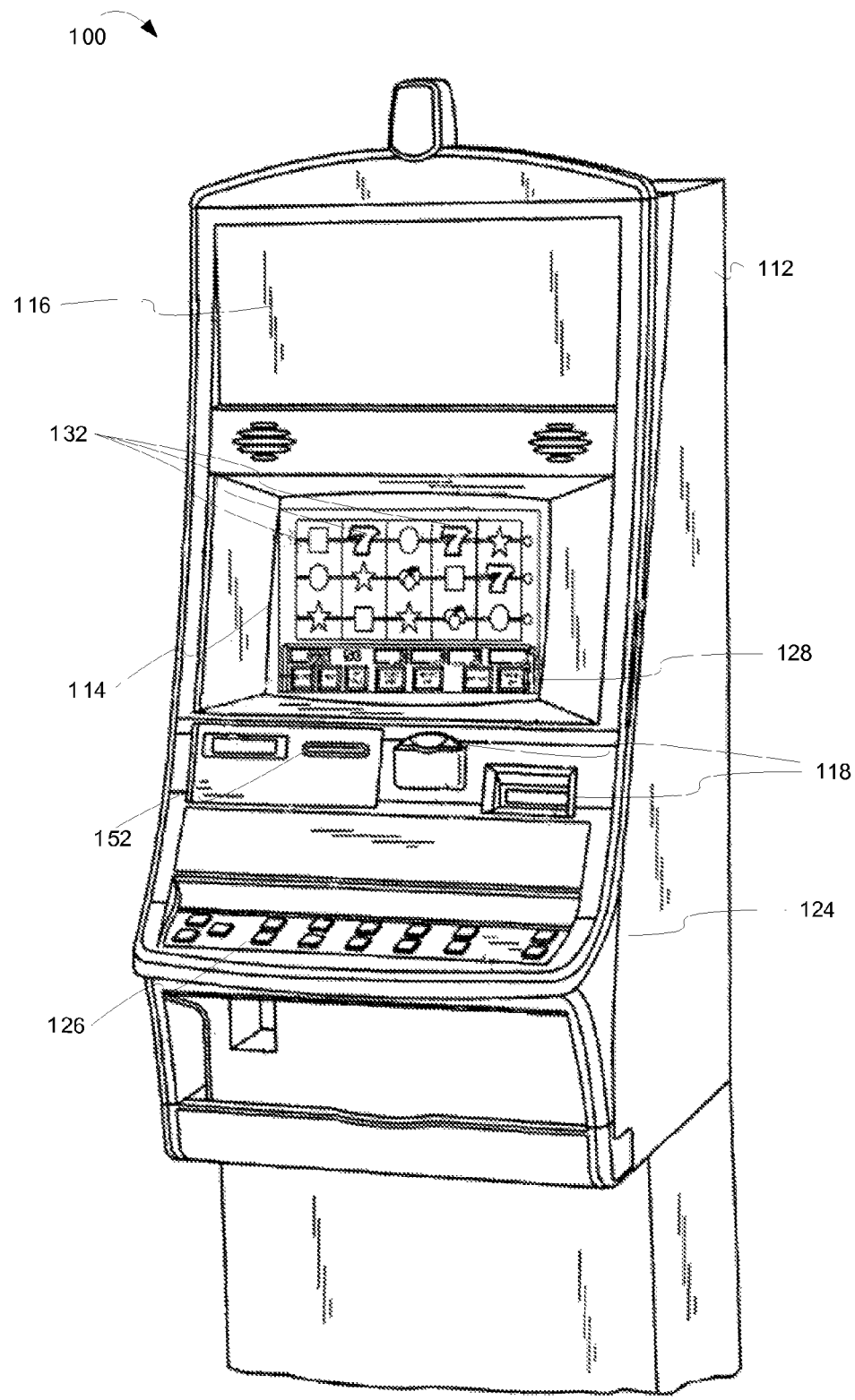
FIG. 1 is a perspective view of a wagering game machine, according to example embodiments of the invention.

FIG. 1 is a perspective view of a wagering game machine, according to example embodiments of the invention. Referring to FIG. 1, a wagering game machine 100 is used in gaming establishments, such as casinos. According to embodiments, the wagering game machine 100 can be any type of wagering game machine and can have varying structures and methods of operation. For example, the wagering game machine 100 can be an electromechanical wagering game machine configured to play mechanical slots, or it can be an electronic wagering game machine configured to play video casino games, such as blackjack, slots, keno, poker, blackjack, roulette, etc.

The wagering game machine 100 comprises a housing 112 and includes input devices, including value input devices 118 and a player input device 124. For output, the wagering game machine 100 includes a primary display 114 for displaying information about a basic wagering game. The primary display 114 can also display information about a bonus wagering game and a progressive wagering game. The wagering game machine 100 also includes a secondary display 116 for displaying wagering game events, wagering game outcomes, and/or signage information. While some components of the wagering game machine 100 are described herein, numerous other elements can exist and can be used in any number or combination to create varying forms of the wagering game machine 100.

The value input devices 118 can take any suitable form and can be located on the front of the housing 112. The value input devices 118 can receive currency and/or credits inserted by a player. The value input devices 118 can include coin acceptors for receiving coin currency and bill acceptors for receiving paper currency. Furthermore, the value input devices 118 can include ticket readers or barcode scanners for reading information stored on vouchers, cards, or other tangible portable storage devices. The vouchers or cards can authorize access to central accounts, which can transfer money to the wagering game machine 100.

The player input device 124 comprises a plurality of push buttons on a button panel 126 for operating the wagering game machine 100. In addition, or alternatively, the player input device 124 can comprise a touch screen 128 mounted over the primary display 114 and/or secondary display 116.

The various components of the wagering game machine 100 can be connected directly to, or contained within, the housing 112. Alternatively, some of the wagering game machine's components can be located outside of the housing 112, while being communicatively coupled with the wagering game machine 100 using any suitable wired or wireless communication technology.

The operation of the basic wagering game can be displayed to the player on the primary display 114. The primary display 114 can also display a bonus game associated with the basic wagering game. The primary display 114 can include a cathode ray tube (CRT), a high resolution liquid crystal display (LCD), a plasma display, light emitting diodes (LEDs), or any other type of display suitable for use in the wagering game machine 100. Alternatively, the primary display 114 can include a number of mechanical reels to display the outcome. In FIG. 1, the wagering game machine 100 is an "upright" version in which the primary display 114 is oriented vertically relative to the player. Alternatively, the wagering game machine can be a "slant-top" version in which the primary display 114 is slanted at about a thirty-degree angle toward the player of the wagering game machine 100. In yet another embodiment, the wagering game machine 100 can exhibit any suitable form factor, such as a free standing model, bartop model, mobile handheld model, or workstation console model.

A player begins playing a basic wagering game by making a wager via the value input device 118. The player can initiate play by using the player input device's buttons or touch screen 128. The basic game can include arranging a plurality of symbols along a payline 132, which indicates one or more outcomes of the basic game. Such outcomes can be randomly selected in response to player input. At least one of the outcomes, which can include any variation or combination of symbols, can trigger a bonus game.

In some embodiments, the wagering game machine 100 can also include an information reader 152, which can include a card reader, ticket reader, bar code scanner, RFID transceiver, or computer readable storage medium interface. In some embodiments, the information reader 152 can be used to award complimentary services, restore game assets, track player habits, etc.

A wagering game machine may also be referred to as an electronic gaming machine or a video lottery terminal.

Figure 2:
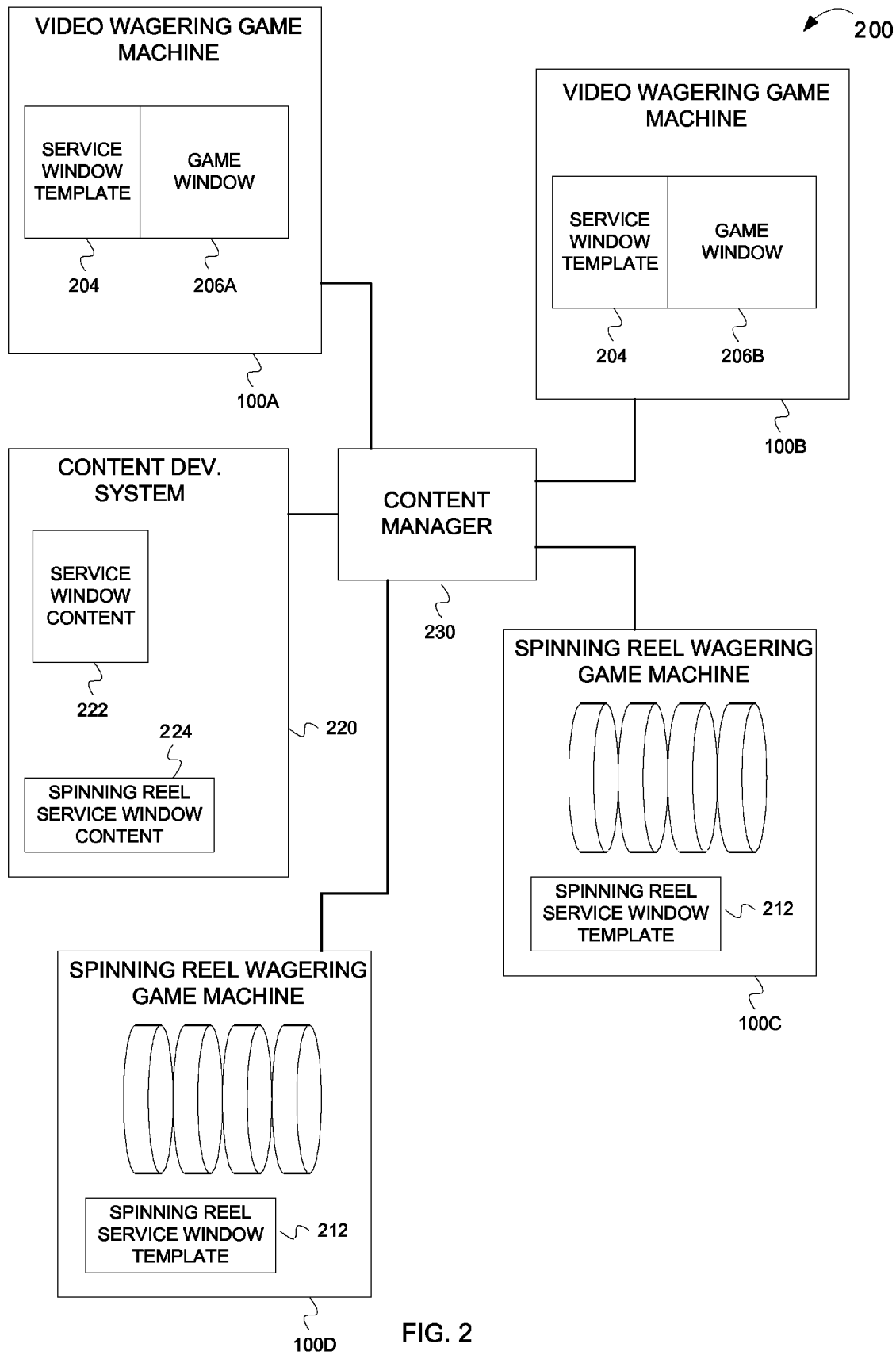
FIG. 2 is a block diagram illustrating components of a window user interface system according to embodiments of the invention.

FIG. 2 is a block diagram illustrating components of a window user interface system 200 according to embodiments of the invention. System 200 can include various types of wagering game machines 100, including video wagering game machines and electromechanical wagering game machines such as spinning reel wagering game machines.

As discussed above, wagering game machines 100 can include various types of displays. Various windows can be provided on the displays. For example, windows on the various displays of a wagering game machine 100 may include a game window 106 and a service window. A service window may provide service related information to a player at a wagering game machine. Game window 106 presents graphical images associated with a base wagering game or bonus wagering game on video based wagering game machines. Those of skill in the art having the benefit of the disclosure will appreciate that other windows may be displayed on a wagering game machine 100. For example, windows may be used to display information related to responsible gaming, bonus games, progressive game information, and wagering transactions. A window may also be referred to as a "display device" or "media display device."

Windows may be displayed according to a template. In general, a template defines a window that can be used to display content to players (or employees) at a wagering game machine. Some windows are intended to be displayed on the primary display 114 of the wagering game machine, while other windows are intended to be displayed on auxiliary screens, such as a display on a top box. The content can be provided by the manufacturer, operator, or third-party application developers. Some windows can be static, while other windows can be touch-sensitive. When touch-sensitive, players can interact with the content, as well as the applications driving the content.

Content includes various types of graphical data intended to be displayed on one or more windows of display screens on a wagering game machine. Various types of content may be displayed. Such content includes outcomes for wagering games, bonus games, community games, progressive games, episodic games, advertising content, responsible gaming content, award or jackpot celebrations, wagering transactions etc. The embodiments are not limited to any particular type of content.

A template can be used to display a specific type of content on a specific area of a screen. As an example, there can be a service window template 204 to display player service applications on the left or right side of a primary screen of a wagering game machine. In some cases, a wagering game machine may not be equipped with the type of screen needed to display a specific type of content. For example, a spinning-reel game may not have a primary screen. In such cases, alternate templates may be provided so that the specific type of content can be displayed on other screens supported by the wagering game machine. For example, a spinning reel service window template 212 can be provided so that player service applications can be displayed in a window on a special screen installed below a spinning-reel mechanism. Those of skill in the art having the benefit of the disclosure will appreciate that other templates may exist for other types of windows and other types of wagering game machines.

In some embodiments, system 200 further includes content development system 220 and content manager 230. Content development system can be used to provide content that is displayed on a wagering game machine. The content may vary depending on the template used. For example, service window content 222 may provide service related content on video based wagering game machines (e.g., 100A and 100B) while spinning reel service window content 224 may be provided to players on spinning reel based wagering game machines (e.g., 100C and 100D). The content may be displayed according to the appropriate template. For example, spinning reel service window content 224 may be displayed according to spinning reel service window template 212 while service window content 222 may be displayed according to service window template 204.

Content manager 230 may be used by a gaming establishment operator to manage the activation of windows and the display of the content on a wagering game machine 100.

In some embodiments, content manager 230 may use templates exposed by a wagering game machine to determine content to be provided to a wagering game machine. Although one content manager 230 is illustrated, it should be noted that multiple content managers may be present and used to manage various windows on various wagering game machines.

Further details on template based content management may be found in Player User Interface Guidelines (Draft 10) published by the Gaming Standards Association, which is hereby incorporated by reference herein for all purposes.

Figure 3:
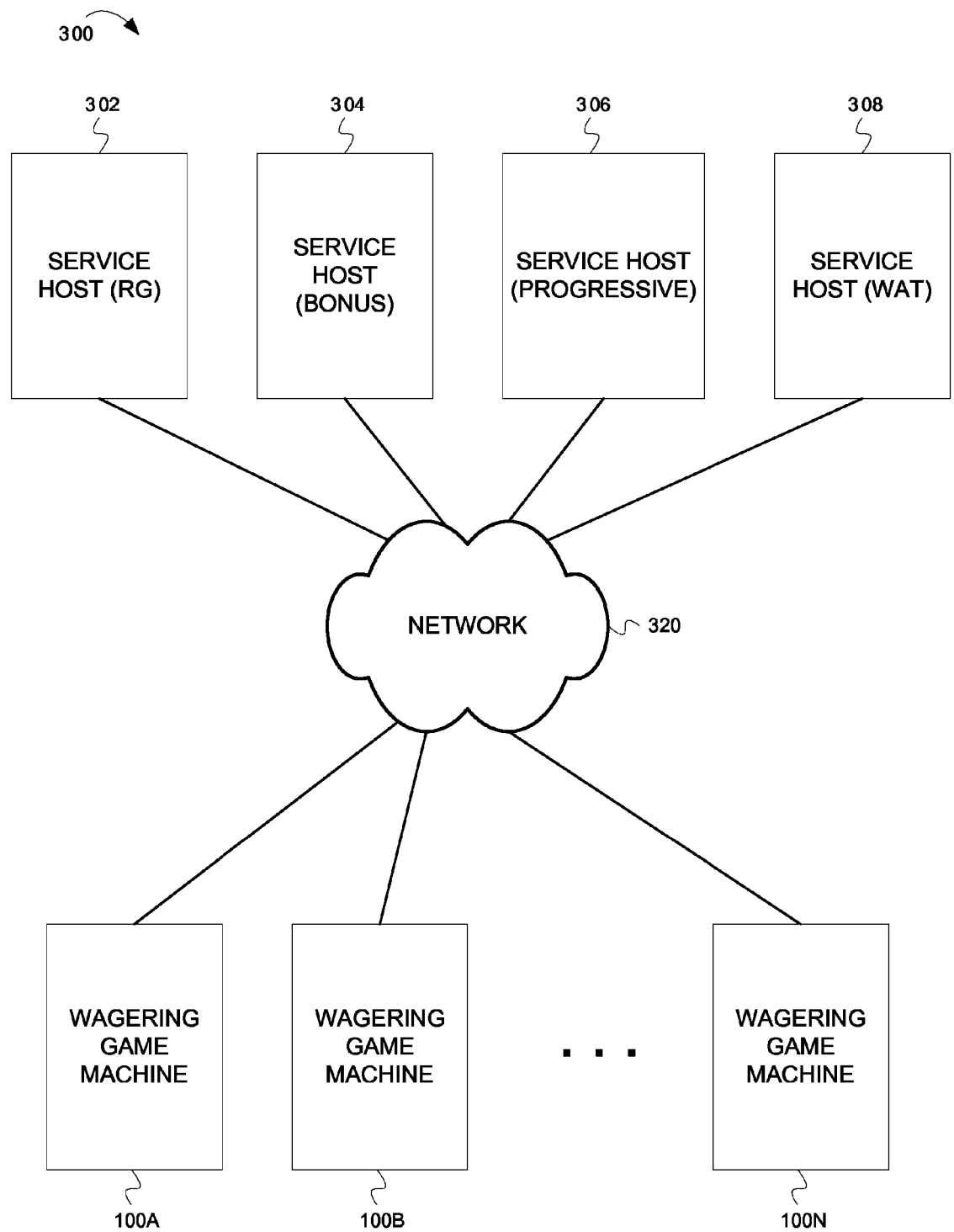
FIG. 3 is a block diagram illustrating an example of multiple content managers in an example wagering game system.

FIG. 3 is a block diagram illustrating an example of multiple content managers in an example wagering game system 300. In the example illustrated in FIG. 3, multiple service hosts 302-308 are each content managers that can provide content to multiple windows on multiple wagering game machines 100A-100N coupled to the service hosts over a network 320. Network 320 can be any combination of one or more networks that communicably couple service hosts to wagering game machines. In some embodiments, network 320 can be a local area network such as an Ethernet. In alternative embodiments, network 320 can be a wide area network or the Internet. A service host may communicate with a wagering game using a variety of protocols. In some embodiments, the G2S™ MESSAGE PROTOCOL published by the Gaming Standards Association is used, which is hereby incorporated by reference for all purposes.

Service hosts 302-308 provide various types of content. For example, service host 302 provides content related to Responsible Gaming (RG). Service host 304 provides content related to bonus games that may be provided on wagering game machines 100. Service host 306 provides information related to one or more progressive games that a wagering game machine 100 can be configured to participate in. Service host 308 provides Wagering Account Transaction (WAT) information. An individual service host may interact with one or more windows on an individual wagering game machine, and further may interact with multiple wagering game machines. As an example, a bonus service may display bonus status information on a service screen. If the bonus amount is awarded, then the bonus service host may request that celebratory content be displayed on a full screen or on a top box screen. Similarly, a progressive service may display the status of a progressive jackpot on service windows of wagering game machines participating in the progressive. When the progressive jackpot is awarded on a wagering game machine, celebratory content may be displayed on a primary window of the wagering game machine that wins the progressive jackpot.

Figure 4:
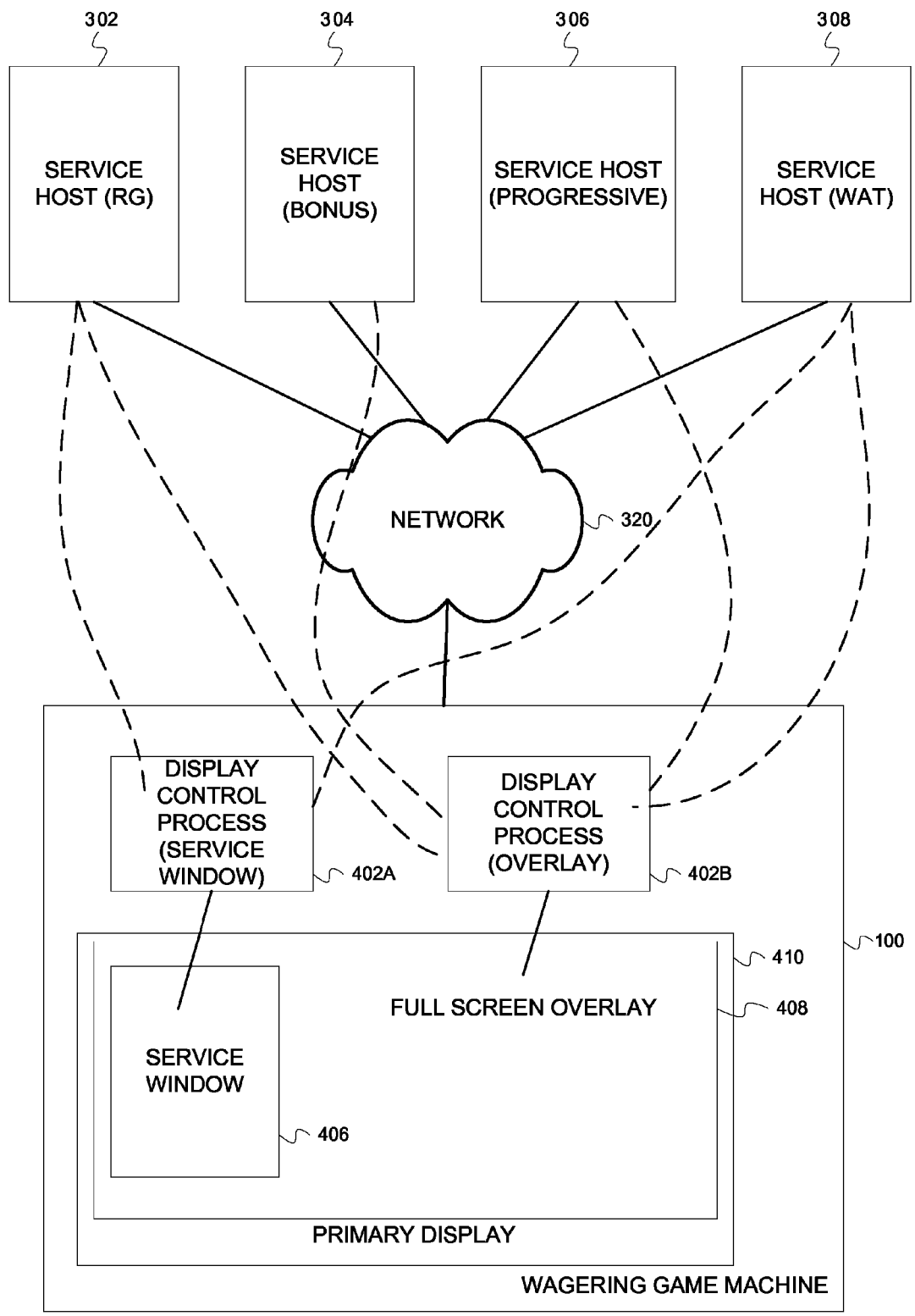
FIG. 4 is a block diagram illustrating further details of wagering game system according to embodiments.

FIG. 4 is a block diagram illustrating further details of wagering game system 300 according to embodiments. In some embodiments, a wagering game machine 100 includes one or more display control processes 402 that coordinate content provided by service hosts. A display control process (DCP) 402 may be dedicated to a particular type of window. In the example illustrated in FIG. 4, display control process 402A coordinates content provided by various service hosts that is intended for service window 406 provided on primary display 410 while display control process 402B coordinates content provided by various service hosts that is intended for a full screen overlay 408 provided on primary display 410. Those of skill in the art having the benefit of the disclosure will appreciate that other types of windows may exist on a wagering game machine 100, including other windows on a primary display or windows on other displays such as a top box display or other auxiliary display. In the example illustrated in FIG. 4, various service hosts provide content to be displayed on service window 406 and full screen overlay 408. Dashed lines are used in FIG. 4 to illustrate logical paths for content between service hosts 302-308 and wagering game machine 100. Service host 302 provides responsible gaming content that can be displayed on either or both service window 406 and full screen overlay window 408 and thus communicate with both DCP 402A and DCP 402B. Service host 304 provides bonus game information that is intended to be displayed on a full screen overlay 408 for primary display 410 and thus communicates with DCP 402B. Similarly, service host 306 provides content related to a progressive game that wagering game machine 100 participates in. In the example shown, progressive information is displayed on full screen overlay 408, thus service host 306 communicates with DCP 402B. Wagering Account Transactions are provided by service host 308, which can display content on both service window 406 and full screen overlay 408 and thus communicates with both DCP 402A and DCP 402B.

As will be appreciated by the example in FIG. 4, a DCP 402 may receive requests to display content from multiple sources (e.g., service hosts 302-308) and thus may share windows with multiple service hosts. In some embodiments, wagering game machine or display windows have one or more profile attributes that indicate whether the window or wagering game machine is capable of being shared. If the window or wagering game machine is advertised as not shared and not settable, then it can only display content from one host. If it is advertised as settable, then content can be displayed by multiple hosts.

In some embodiments, services may be configured as "owners" or "guests" for a particular window. A service that is configured as an owner is generally given priority when displaying content. A service that is configured as a guest may be permitted to display content on a window, but may not be allowed to display content if an owner service is displaying content at the time the guest service desires to display content. Further, if one guest service has control of a window, other guest services may be prevented from displaying content on the window.

Further details on the operations of a DCP to manage content requests are provided below with reference to FIGS. 5-9.

Example Operations

This section describes operations associated with some embodiments of the invention. In the discussion below, the flow diagrams will be described with reference to the block diagrams presented above. However, in some embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flow diagram.

Figure 5:
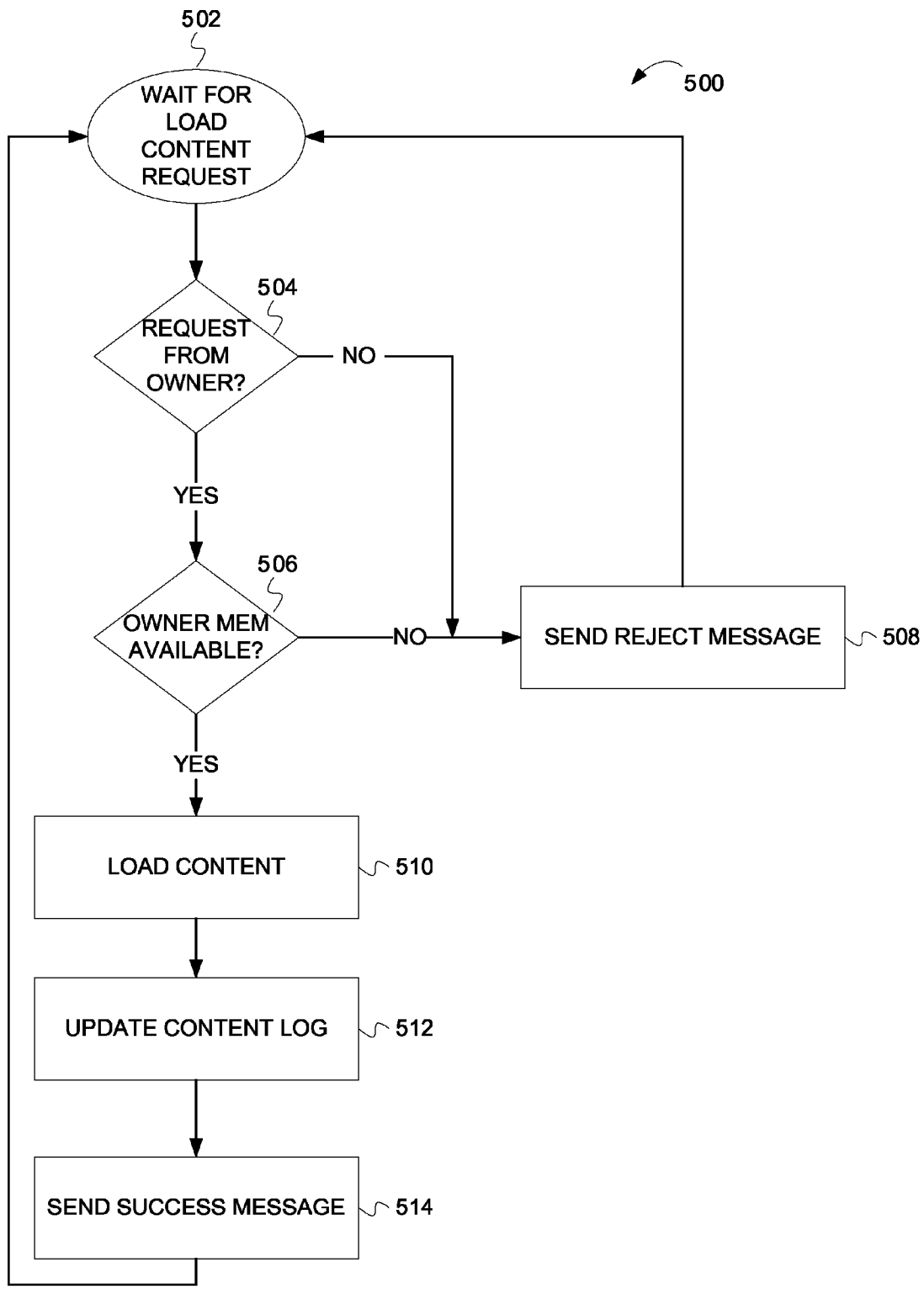
FIG. 5 is a flowchart illustrating a method for loading content using an unshared display control process.

FIG. 5 is a flowchart illustrating a method 500 for loading content using an unshared display control process. Method 500 begins at block 502 by waiting for a load content request to be received from a content manager such as service host. The request will typically identify the content to be loaded, and in some embodiments, will identify the host making the request. In response to receiving a request to load content, at block 504 a DCP 402 determines if the request is from an owner of a window managed by the DCP 402.

If the check at block 504 determines that the request is from a service other than an owner service, then at block 508 DCP 402 sends a reject message to the source of the request indicating that the content is rejected and will not be loaded onto the window controlled by the DCP.

Otherwise, if the check at block 504 determines that the request to load content is from an owner service, then at block 506, the DCP checks to determine if there are enough resources available to display the content in the desired window. For example, DCP 402 may determine if there is enough memory allocated for the owner to display the content. Other resources may include processor resources or network resources. In some embodiments, resources may be allocated between host and guest services. For example, in some embodiments, an owner may calculate resource allocation values based on number of guests and available storage. Further, resource allocation values may be based on whether the status of the service, for example, whether the service is an owner service or guest service. Purely as an example and not as a limitation, an allocation algorithm may allocate 50% of a resource for the owner and the remainder evenly split among guests.

If the check at block 506 determines that there are not sufficient resources to display the content, then at block 508 DCP 402 sends a reject message to the source of the request indicating that the content is rejected and will not be loaded onto the window controlled by the DCP. Alternatively, if there are sufficient resources, then at block 510 the requested content is displayed on the window controlled by DCP 402.

At block 512, DCP 402 updates a content log that provides information regarding the content displayed in the window controlled by DCP 402.

At block 514, a success message is sent to the source of the load content request indicating that the content was loaded successfully and the method returns to block 502 to await further requests to load content.

Figure 6:
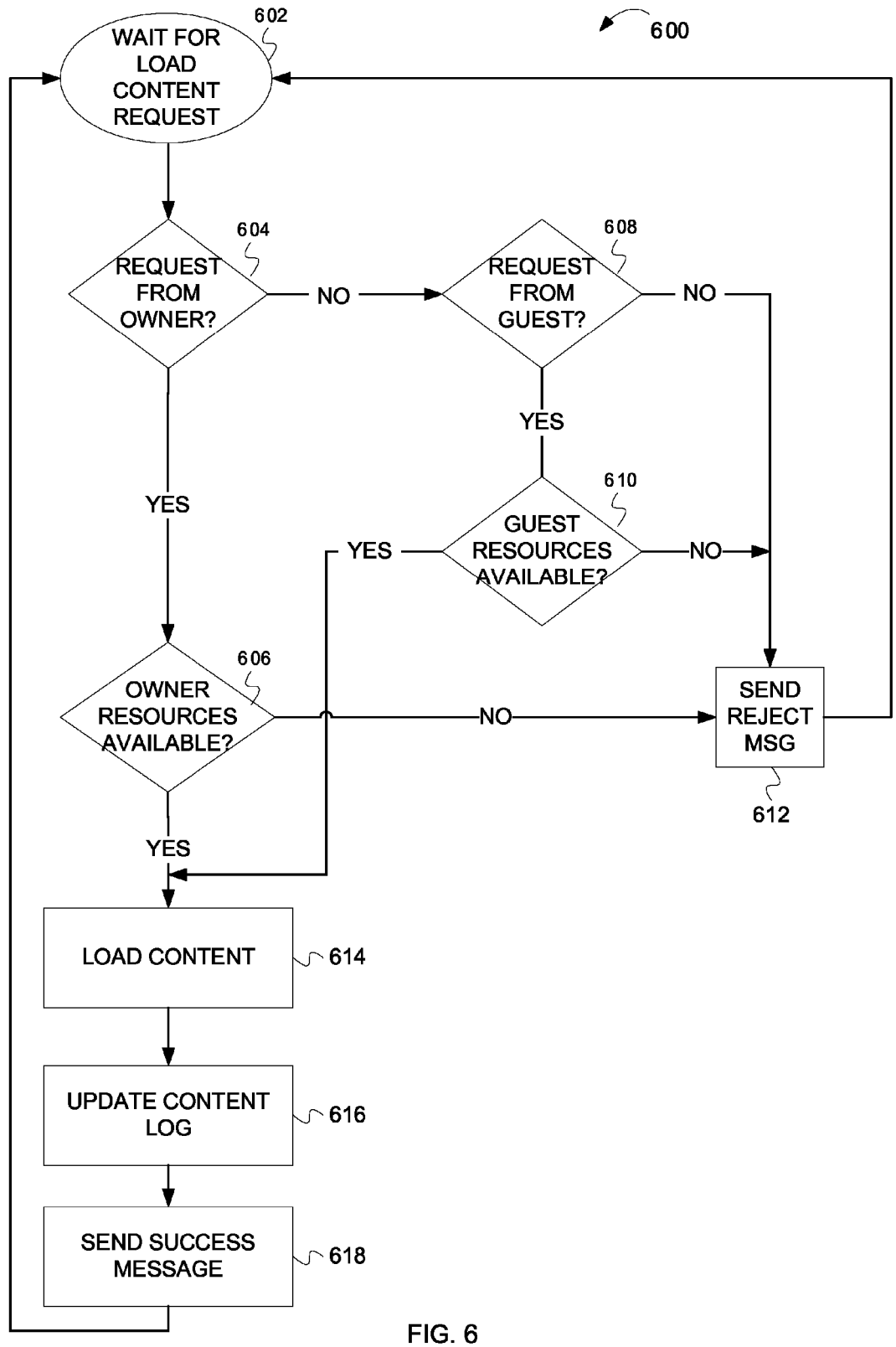
FIG. 6 is a flowchart illustrating a method for loading content for windows that may be shared by various services.

FIG. 6 is a flowchart illustrating a method 600 for loading content for windows that may be shared by various services. Method 600 begins at block 602 by waiting for a load content request to be received from a content manager such as a service host. In response to receiving a request to load content, at block 604 a DCP 402 determines if the request is from a source configured as an owner of a window managed by the DCP 402.

If the check at block 604 determines that the request to load content is from an owner service, then at block 606, the DCP 402 checks to determine if there are enough resources available to display the content in the desired window. For example, DCP 402 may determine if there is enough memory allocated for the owner to display the content.

If the check at block 606 determines that there are not sufficient resources to display the content, then at block 612 DCP 402 sends a reject message to the source of the request indicating that the content is rejected and will not be loaded onto the window controlled by the DCP and the method proceeds to block 614.

If the check at block 604 determines that the request is not from an owner service, then at block 608, the DCP checks to determine if the request is from a source configured as a guest. If the service is not configured as a guest, then at block 612 DCP 402 sends a reject message to the source of the request indicating that the content is rejected and will not be loaded onto the window controlled by the DCP.

If the check at block 608 determines that the source of the request is configured as a guest, then at block 610 the DCP checks to see if there are sufficient guest resources to display the requested content. For example, DCP 402 may check to determine if there is sufficient memory allocated to the guest to display the content. If the check at block 608 determines that there are sufficient resources, then the method proceeds to block 614. Alternatively, if there are not sufficient resources allocated to the guest to display the requested content, then the method proceeds to block 612 and DCP 402 sends a reject message to the source of the request indicating that the content is rejected and will not be loaded onto the window controlled by the DCP.

At block 614, the request has been determined to come from either an owner or a guest for the desired window, and there are sufficient resources to display the requested content. DCP 402 then causes the requested content to be loaded onto the window controlled by the DCP.

At block 616, DCP 402 updates a content log that provides information regarding the content displayed in the window controlled by DCP 402.

At block 618, a success message is sent to the source of the load content request indicating that the content was loaded successfully and the method returns to block 602 to await further requests to load content.

Figure 7:
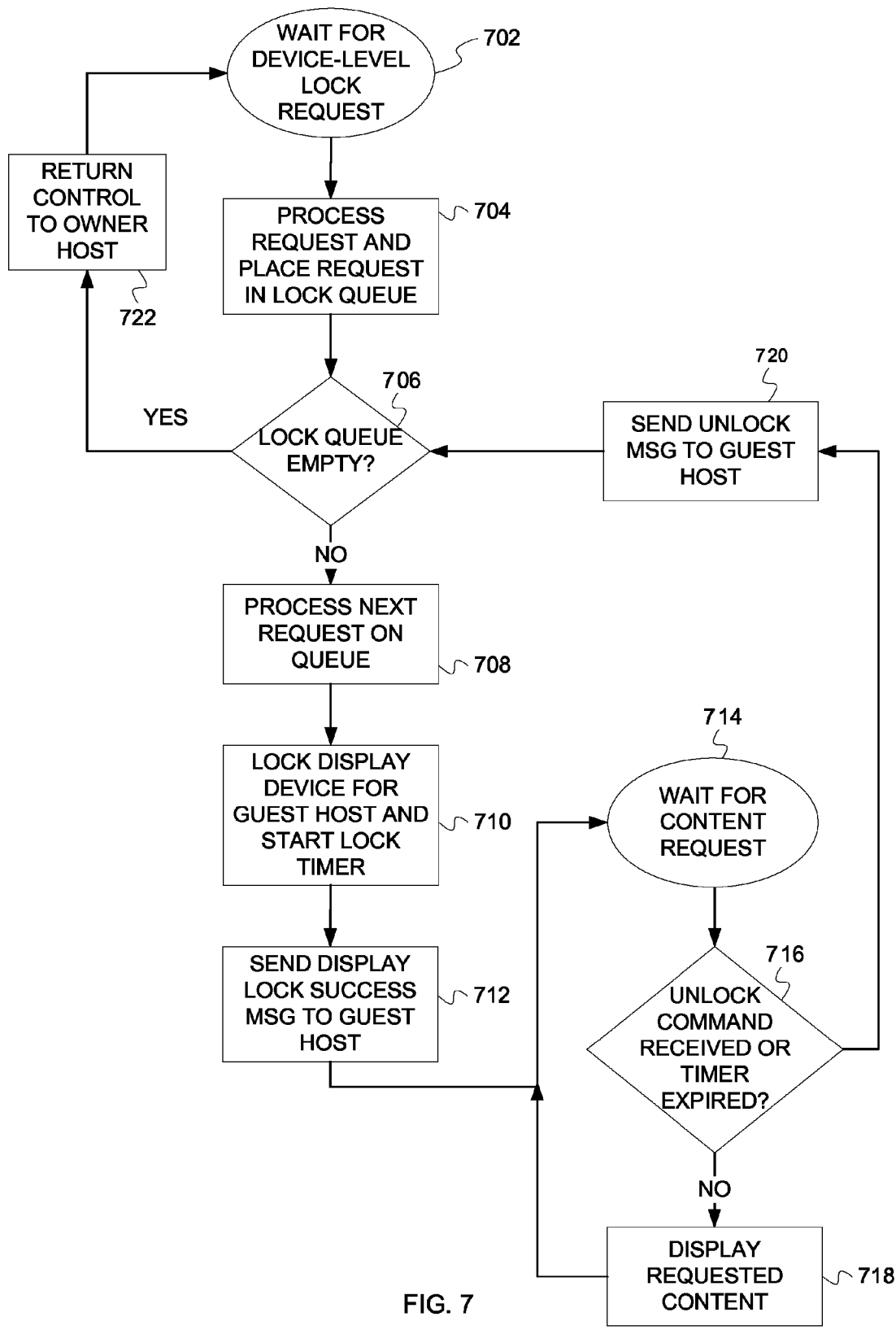
FIG. 7 is a flowchart illustrating a method for locking a display window that is shared by multiple hosts or services.

FIG. 7 is a flowchart illustrating a method 700 for locking a display window that is shared by multiple hosts or services. The method begins at block 702 with waiting for a device-level lock request. A device-level lock request is a request to lock a window identified in the request, thus device in this context refers to a window and not a display device in its entirety.

In response to receiving a device-level lock request, at block 704 a DCP processes the request and places the request in a lock queue for the device. The request may be checked for validity. For example, the request may be checked to determine that it is in the proper format, has correct values, and is from a owner or guest host. Those of skill in the art having the benefit of the disclosure will appreciate that other validity checks may be performed.

At block 706, a check is made to determine if the lock queue for the device (window) is empty. If the lock queue is empty, then the method proceeds to block 722 to return control of the associated window to the owner host. The DCP then proceeds to await further requests to lock the device (window) controlled by the DCP.

If the check at block 706 determines that the queue is not empty, then at block 708 the DCP processes the next request on the queue. The queue may be processed according to any of a variety of queuing algorithms. The queue may be processed as a LIFO (Last In, First Out) queue or a FIFO (First In, First Out) queue. Additionally, queue entries may be assigned or include a priority value which may be used to select which entry of the queue to process next. As an example, a host or service may be assigned a priority. The DCP may choose which lock request in the queue to process based on the priority of the requesting host. Those of skill in the art having the benefit of the disclosure will appreciate that other priority assignment mechanisms may be used.

At block 710 the display device coordinated by the DCP is locked for the guest host. In addition, in some embodiments, a lock timer is started. The lock timer determines a maximum time that a guest is allowed to lock a display device and thus can be used to prevent a host or service from keeping the window locked for too long.

At block 712, the DCP sends a lock success message to the guest host that was the source of the lock request currently being processed.

At block 714, the DCP then waits for a content request.

In response to receiving a content request, the DCP checks to determine if an unlock command was received or if the lock time has expired. If an unlock command has not been received and the timer associated with the current lock has not expired, then at block 718 the DCP causes the requested content to be displayed.

Alternatively, if the lock timer has expired or an intervening unlock request has been received, then at block 720 the DCP sends an unlock message to the guest host that was the source of the current lock request.

The method then returns to block 706 to check for further queue entries.

Figure 8:
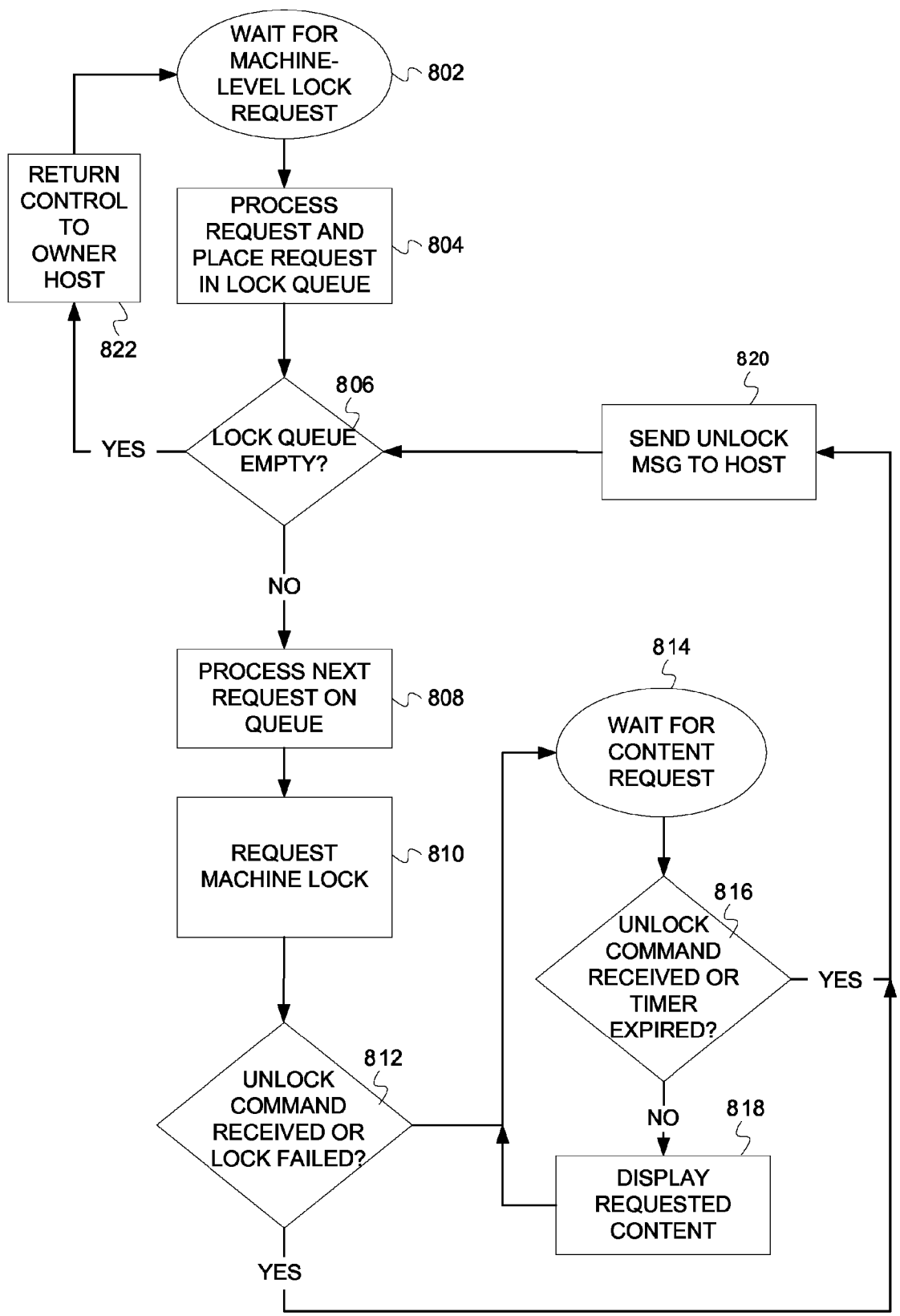
FIG. 8 is a flowchart illustrating a method for locking a wagering game machine that is shared by multiple hosts or services.

FIG. 8 is a flowchart illustrating a method 800 for locking a wagering game machine that is shared by multiple hosts or services. The method begins at block 802 with waiting for a machine-level lock request. A machine-level lock request is a request to lock all windows on a wagering game machine.

In response to receiving a machine-level lock request, at block 804 a DCP 402 places the request in a lock queue for the wagering game machine. Like block 704, the processing at block 804 may include checking the request for validity. For example, the request may be checked to determine that it is in the proper format, has correct values, and is from a owner or guest host. Those of skill in the art having the benefit of the disclosure will appreciate that other validity checks may be performed.

At block 806, a check is made to determine if the lock queue for the wagering game machine is empty. If the lock queue is empty, then the method proceeds to block 822 to return control of the wagering game machine to the owner host. The DCP then proceeds to await further requests to lock the wagering game machine.

If the check at block 806 determines that the queue is not empty, then at block 808 the DCP processes the next request on the queue. The queue may be processed as a LIFO queue or a FIFO queue. Further, entries in the queue may be assigned a priority or a priority may be inferred based on the source of the request. The queue entry to process may be based on the priority.

At block 810 the wagering game machine is locked for the guest host requesting the lock. In addition, in some embodiments, a lock timer is started. The lock timer determines a maximum time that a guest is allowed to lock a wagering game machine and thus can be used to prevent a host or service from keeping the wagering game machine locked for too long.

At block 812, the method checks to determine if an unlock command has been received of the lock command issued at block 810 failed. If so, then the method proceeds to block 820 to send an unlock message to the guest host requesting the lock.

Alternatively, if the check at block 812 determines that the lock succeeded and no intervening unlock commands have been received, then the method proceeds to block 814 to await requests to load content from the guest host locking the wagering game machine.

In response to receiving a load content request, at block 816 the method determines if an intervening unlock command has been received of if the lock time set at block 810 has expired. If no unlock command has been received and the lock has not expired, then at block 818 the DCP causes the requested content to be displayed. The method then returns to block 814 to await further requests to load content.

Alternatively, if the lock has expired or an intervening unlock request has been received, then the method proceeds to block 820 where an unlock message is sent to the guest host issuing the lock currently being processed.

The method then returns to block 806 to check for further queue entries.

Figure 9:
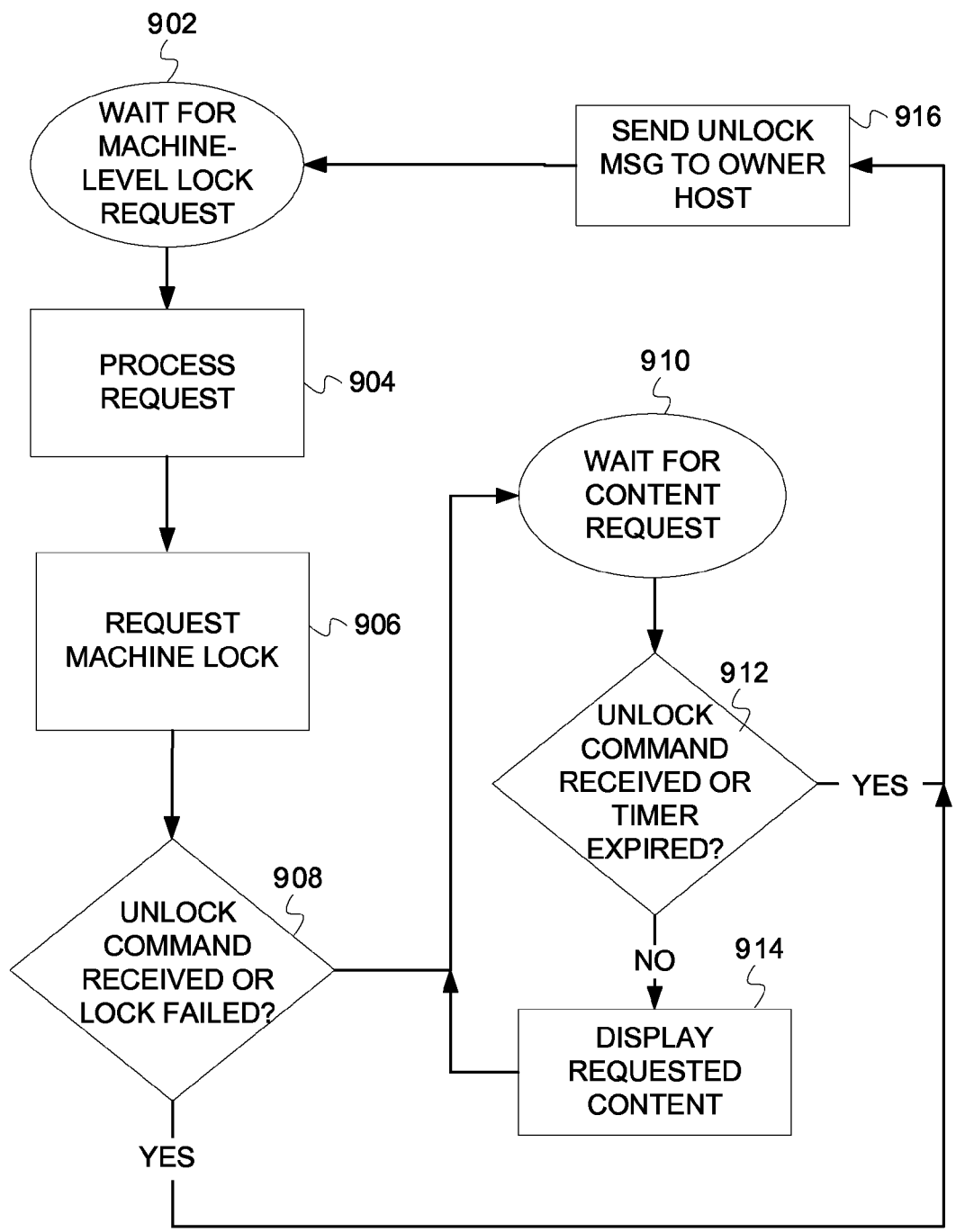
FIG. 9 is a flowchart illustrating a method for locking a wagering game machine that is not shared.

FIG. 9 is a flowchart illustrating a method 900 for locking a wagering game machine that is not shared. The method begins at block 902 with waiting for a machine-level lock request. A machine-level lock request is a request to lock all windows on a wagering game machine.

At block 904, the DCP process the lock. As with blocks 704 and 804, the processing at block 904 may include checking the request for validity. For example, the request may be checked to determine that it is in the proper format, has correct values, and is from a owner or guest host. Those of skill in the art having the benefit of the disclosure will appreciate that other validity checks may be performed.

At block 906, the DCP then executes a request to lock the wagering game machine. In addition, in some embodiments, a lock timer is started. The lock timer determines a maximum time that the wagering game machine is allowed to be locked and can thus can be used to prevent a host or service from keeping the wagering game machine locked for too long.

At block 908, the method checks to determine if an unlock command has been received of the lock command issued at block 906 failed. If so, then the method proceeds to block 916 to send an unlock message to the owner host requesting the lock.

Alternatively, if the check at block 908 determines that the lock succeeded and no intervening unlock commands have been received, then the method proceeds to block 910 to await requests to load content from the owner host locking the wagering game machine.

In response to receiving a load content request, at block 912 the method determines if an intervening unlock command has been received of if the lock timer set at block 906 has expired. If no unlock command has been received and the lock timer has not expired, then at block 914 the DCP causes the requested content to be displayed. The method then returns to block 910 to await further requests to load content.

Alternatively, if the lock has expired or an intervening unlock request has been received, then the method proceeds to block 916 where an unlock message is sent to the owner host issuing the lock currently being processed.

The method then returns to block 902 to wait for further requests to lock the wagering game machine.

It should be noted that any of the requests to load content in methods 600, 700, 800 or 900 can be filtered or selected according various criteria. For example, content may be filtered according a player identification or player status obtained via a player tracking system or other loyalty based system.

In particular embodiments using the G2S protocol, a guest host may lock a wagering game machine or window of a wagering game machine in order to execute G2S commands that affect the display output of the wagering game machine. These commands include the "loadContent", "setActiveContent", "showMediaDisplay" and "hideMediaDisplay" commands.

Operating Environment

This section describes an example operating environment and presents structural aspects of some embodiments. This section includes discussion about wagering game machine architectures, and wagering game networks.

Wagering Game Machine Architectures

Figure 10:
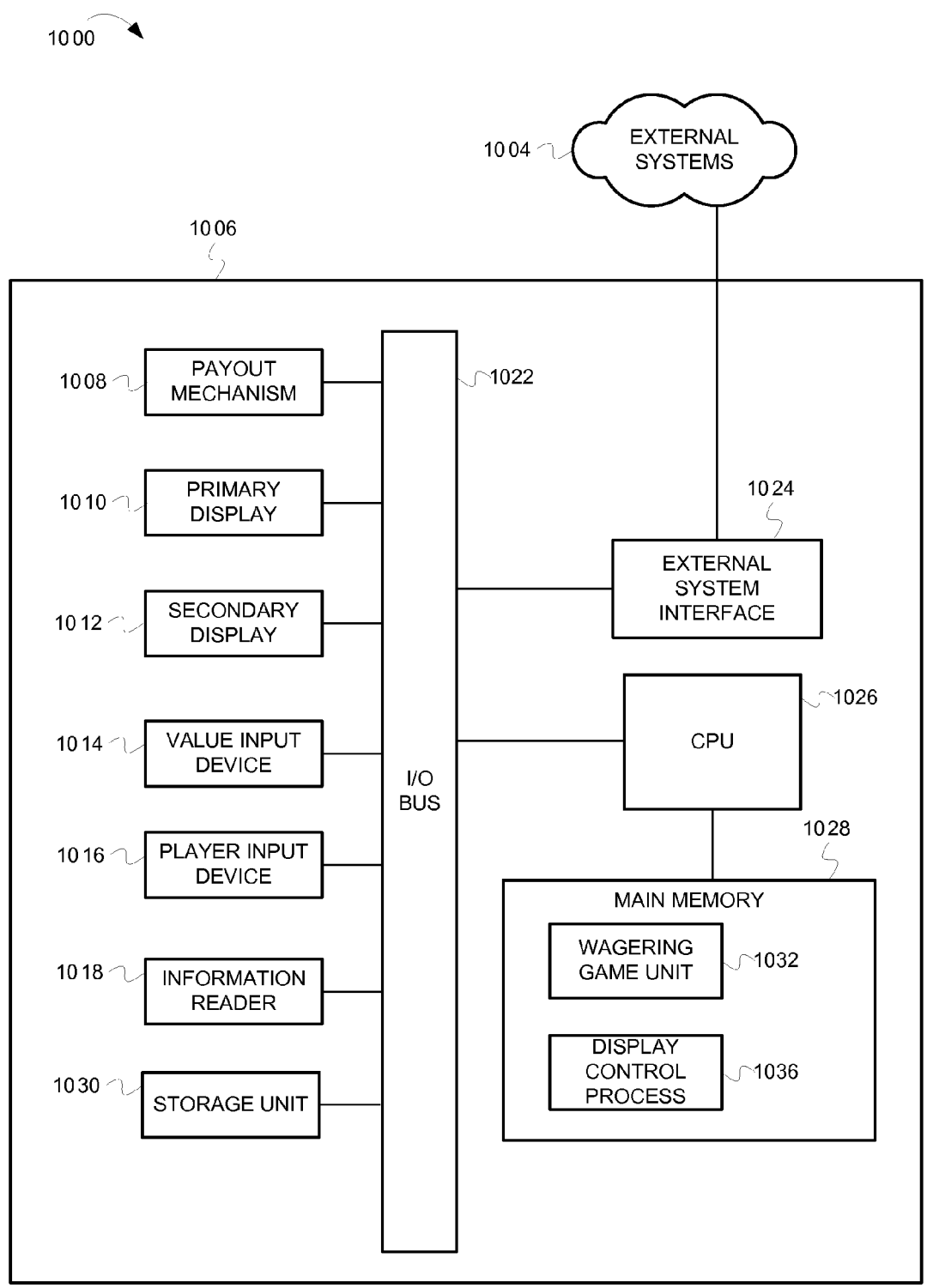
FIG. 10 is a block diagram illustrating a wagering game machine architecture, according to example embodiments of the invention.

FIG. 10 is a block diagram illustrating a wagering game machine architecture, according to example embodiments of the invention. As shown in FIG. 10, the wagering game machine architecture 1000 includes a wagering game machine 1006, which includes a central processing unit (CPU) 1026 connected to main memory 1028. The CPU 1026 can include any suitable processor, such as an Intel® Pentium processor, Intel® Core 2 Duo processor, AMD Opteron™ processor, or UltraSPARC processor. The main memory 1028 includes a wagering game unit 1032. In one embodiment, the wagering game unit 1032 can present wagering games, such as video poker, video black jack, video slots, video lottery, etc., in whole or part. Main memory 1028 may also include a display control process 1036.

The CPU 1026 is also connected to an input/output (I/O) bus 1022, which can include any suitable bus technologies, such as an AGTL+ frontside bus and a PCI backside bus. The I/O bus 1022 is connected to a payout mechanism 1008, primary display 1010, secondary display 1012, value input device 1014, player input device 1016, information reader 1018, and storage unit 1030. The player input device 1016 can include the value input device 1014 to the extent the player input device 1016 is used to place wagers. The I/O bus 1022 is also connected to an external system interface 1024, which is connected to external systems 1004 (e.g., wagering game networks).

In one embodiment, the wagering game machine 1006 can include additional peripheral devices and/or more than one of each component shown in FIG. 10. For example, in one embodiment, the wagering game machine 1006 can include multiple external system interfaces 1024 and/or multiple CPUs 1026. In one embodiment, any of the components can be integrated or subdivided.

Any component of the architecture 1000 can include hardware, firmware, and/or machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

While FIG. 10 describes an example wagering game machine architecture, this section continues with a discussion wagering game networks.

Wagering Game Networks

Figure 11:
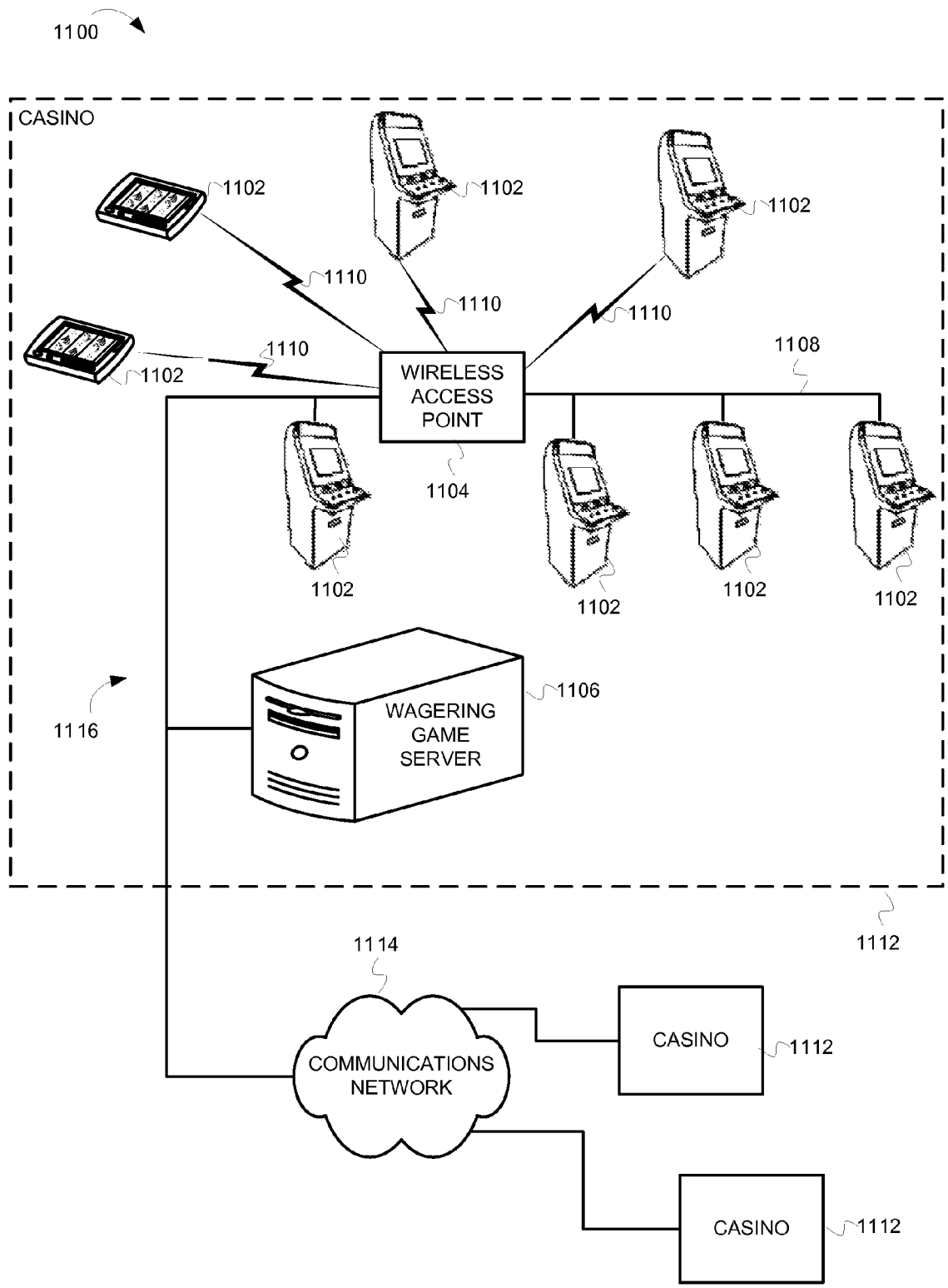
FIG. 11 is a block diagram illustrating a wagering game network, according to example embodiments of the invention.

FIG. 11 is a block diagram illustrating a wagering game network 1100, according to example embodiments of the invention. As shown in FIG. 11, the wagering game network 1100 includes a plurality of casinos 1112 connected to a communications network 1114.

Each casino 1112 includes a local area network 1116, which includes an access point 1104, a wagering game server 1106, and wagering game machines 1102. The access point 11304 provides wireless communication links 1110 and wired communication links 1108. The wired and wireless communication links can employ any suitable connection technology, such as Bluetooth, 802.11, Ethernet, public switched telephone networks, SONET, etc. In some embodiments, the wagering game server 1106 can serve wagering games and distribute content to devices located in other casinos 1112 or at other locations on the communications network 1114.

The wagering game machines 1102 described herein can take any suitable form, such as floor standing models, handheld mobile units, bartop models, workstation-type console models, etc. Further, the wagering game machines 1102 can be primarily dedicated for use in conducting wagering games, or can include non-dedicated devices, such as mobile phones, personal digital assistants, personal computers, etc. In one embodiment, the wagering game network 1100 can include other network devices, such as accounting servers, wide area progressive servers, player tracking servers, and/or other devices suitable for use in connection with embodiments of the invention.

In some embodiments, wagering game machines 1102 and wagering game servers 1106 work together such that a wagering game machine 1102 can be operated as a thin, thick, or intermediate client. For example, one or more elements of game play may be controlled by the wagering game machine 1102 (client) or the wagering game server 1106 (server). Game play elements can include executable game code, lookup tables, configuration files, game outcome, audio or visual representations of the game, game assets or the like. In a thin-client example, the wagering game server 1106 can perform functions such as determining game outcome or managing assets, while the wagering game machine 1102 can present a graphical representation of such outcome or asset modification to the user (e.g., player). In a thick-client example, the wagering game machines 1102 can determine game outcomes and communicate the outcomes to the wagering game server 1106 for recording or managing a player's account.

In some embodiments, either the wagering game machines 1102 (client) or the wagering game server 1106 can provide functionality that is not directly related to game play. For example, account transactions and account rules may be managed centrally (e.g., by the wagering game server 1106) or locally (e.g., by the wagering game machine 1102). Other functionality not directly related to game play may include power management, presentation of advertising, software or firmware updates, system quality or security checks, etc.

Any of the wagering game network components (e.g., the wagering game machines 1102) can include hardware and machine-readable media including instructions for performing the operations described herein.

GENERAL

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method comprising:
receiving, via a network interface of a wagering game machine configured to present a wagering game upon which monetary value may be wagered, a request to load digital content for a user interface window displayed on an electronic display of the wagering game machine, the request received from a service host computer of a plurality of service host computers configured to transmit requests to the user interface window via a network communicably coupling the plurality of service host computers to the wagering game machine;
determining by one or more processors if the service host computer issuing the request is configured as one of an owner of the user interface window or a guest host of the user interface window, wherein the owner of the user interface window is provided priority access to the user interface window over the guest host of the user interface window; and
in response to determining that the service host computer issuing the request is the owner of the user interface window, loading the digital content for display on the user interface window.

2. The method of claim 1, and further comprising:
determining if sufficient resources associated with the owner are available on the wagering game machine to process the request; and
in response to determining that there are not sufficient resources, rejecting the request.

3. The method of claim 1, and further comprising:
in response to determining that the service host computer issuing the request is not the owner or the guest host of the user interface window, rejecting the request.

4. The method of claim 3, and further comprising:
determining if sufficient resources associated with the guest host are available on the wagering game machine to process the request; and
in response to determining that there are not sufficient resources, rejecting the request.

5. The method of claim 1, further comprising:
obtaining from a queue a request from the guest host to lock the user interface window;
locking the user interface window;
transmitting a message to the guest host indicating the request was successful;
in response to receiving the request to load the digital content for the user interface window, determining whether the user interface window continues to be locked by the guest host; and
in response to determining that the user interface window continues to be locked by the guest host, displaying the digital content.

6. The method of claim 5, and further comprising setting a timer in response to locking the user interface window;
wherein determining that the user interface window continues to be locked includes determining that the timer has not expired.

7. The method of claim 6, wherein the queue is a FIFO (First In, First Out) queue.

8. The method of claim 6, wherein obtaining the request from the queue includes obtaining the request in accordance with a priority associated with the request.

9. A non-transitory machine-readable medium having stored thereon machine executable instructions, that when executed, cause one or more processors of a wagering game machine configured to present a wagering game upon which monetary value may be wagered to perform operations comprising:
receiving, via a network interface of the wagering game machine, a request to load digital content for a user interface window displayed on an electronic display of the wagering game machine, the request received from a service host computer of a plurality of service host computers configured to send requests to the user interface window via a network communicably coupling the plurality of service host computers to the wagering game machine;
determining by the one or more processors if the service host computer issuing the request is configured as an owner of the user interface window or a guest host of the user interface window, wherein the owner of the user interface window is provided priority access to the user interface window over the guest host of the user interface window; and
in response to determining that the service host computer issuing the request is the owner of the user interface window, loading the digital content for display on the user interface window.

10. The non-transitory machine-readable medium of claim 9, wherein the operations further comprise:
determining if sufficient resources associated with the owner are available on the wagering game machine to process the request; and
in response to determining that there are not sufficient resources, rejecting the request.

11. The non-transitory machine-readable medium of claim 9, wherein the operations further comprise:
in response to determining that the service host computer issuing the request is not the owner or the guest host of the user interface window, rejecting the request.

12. The non-transitory machine-readable medium of claim 11, wherein the operations further comprise:
determining if sufficient resources associated with the guest host are available on the wagering game machine to process the request; and
in response to determining that there are not sufficient resources, rejecting the request.

13. The non-transitory machine-readable medium of claim 9, wherein the operations further comprise:
obtaining from a queue a request from the guest host to lock the wagering game machine;
requesting the wagering game machine to lock;
receiving digital content from the guest host;
determining if the wagering game machine remains locked by the guest host; and
in response to determining that the wagering game machine continues to be locked by the guest host, displaying the digital content.

14. The non-transitory machine-readable medium of claim 13,
wherein the operations further comprise setting a timer in response to locking the wagering game machine; and
wherein determining that the wagering game machine continues to be locked includes determining that the timer has not expired.

15. The non-transitory machine-readable medium of claim 13, wherein the queue is a FIFO (First In, First Out) queue.

16. The non-transitory machine-readable medium of claim 13, wherein obtaining the request from the queue includes obtaining the request in accordance with a priority associated with the request.

17. A wagering game machine comprising:
one or more processors configured to present a wagering game upon which monetary value may be wagered;
a network interface; and
a display controller executable by the one or more processors and configured to:
receive, via the network interface, a request to load digital content for a user interface window displayed on an electronic display of the wagering game machine, the request received from a service host computer of a plurality of service computers configured to send requests to the user interface window via a network communicably coupling the plurality of service host computers to the wagering game machine,
determine if the service host computer issuing the request is configured as an owner of the user interface window or a guest host of the user interface window, wherein the owner of the user interface window is provided priority access to the user interface window over the guest host of the user interface window, and
in response to determining that the service host computer issuing the request is the owner of the window, load the digital content for display on the user interface window.

18. The wagering game machine of claim 17, wherein the display controller is further configured to:
determine if sufficient resources associated with the owner are available on the wagering game machine to process the request; and
reject the request in response to determining that there are not sufficient resources.

19. The wagering game machine of claim 17, wherein the display controller is further configured to:
reject the request in response to determining that the service host computer issuing the request is not the owner or the guest host of the user interface window.

20. The wagering game machine of claim 19, wherein the display controller is further configured to:
determine if sufficient resources associated with the guest host are available on the wagering game machine to process the request; and
reject the request in response to determining that there are not sufficient resources.

\* \* \* \* \*